United States Patent [19]

Koike

[11] Patent Number: 5,197,894

[45] Date of Patent: Mar. 30, 1993

[54] ELECTRICAL CONNECTOR EQUIPPED WITH A RELEASE MECHANISM

[75] Inventor: Kazumasa Koike, Tokyo, Japan

[73] Assignee: Japan Aviation Electronics Industry, Limited, Tokyo, Japan

[21] Appl. No.: 889,156

[22] Filed: May 27, 1992

[30] Foreign Application Priority Data

May 30, 1991 [JP] Japan .............................. 2-48270[U]

[51] Int. Cl.⁵ ......................................... H01R 13/62
[52] U.S. Cl. .................................................. 439/159
[58] Field of Search .................................. 439/152–160

[56] References Cited

U.S. PATENT DOCUMENTS

| | | | |
|---|---|---|---|
| 4,952,161 | 8/1990 | Komatsu | 439/159 |
| 5,026,296 | 6/1991 | Hashiguchi | 439/159 |
| 5,051,101 | 9/1991 | Komatsu | 439/159 |
| 5,145,389 | 9/1992 | Okubo | 439/159 |

Primary Examiner—Joseph H. McGlynn
Attorney, Agent, or Firm—Laff, Whitesel, Conte & Saret

[57] ABSTRACT

An electrical connector has a release mechanism for releasing a plurality of mating elements. An insulator frame body has a plurality of conductive fixed contacts. The frame body is provided with a plurality of flat plates for moving the mating elements. The flat plates move to release the mating elements from engagement with the electrical connector. A plurality of lever means are pivotally and rotatably supported on the frame body to produce a force required to release the mating elements. Each of the lever means comprises an end portion mechanically coupled to a corresponding one of the flat plates, and an opposite end portion mechancially coupled to one manually operated means. When the manually operated means is pressed in an engaging direction, the lever means are sequentially rotated at different timings. As a result, the flat plates are sequentially moved together with the mating elements in a releasing direction with time delays.

12 Claims, 10 Drawing Sheets

ELECTRICAL CONNECTOR EQUIPPED WITH A RELEASE MECHANISM

BACKGROUND OF THE INVENTION

This invention relates to an electrical equipped with a release mechanism for releasing a mating element from engagement with the electrical connector and, in particular, to an electrical connector equipped with a release mechanism for releasing a plurality of mating elements in a time sequential fashion.

A conventional electrical connector equipped with a release mechanism is disclosed, for example, in U.S. Pat. No. 5,026,296 issued to Hashiguchi and assigned to the present assignee. In Hashiguchi patent, connection and disconnection are performed between one electrical connector and one mating element. The electrical connector comprises an insulator frame body for receiving a mating element and a release mechanism incorporated in the frame body. The mating element has a plurality of conductive mating contacts. The frame body has a plurality of fixed contacts for connection with the mating contacts. The release mechanism is for releasing the mating element from connection or engagement with the fixed contacts. The release mechanism comprises a flat plate movable in an engaging direction and a releasing direction, one lever means for moving the flat plate, and one manually operated means. The frame body is provided with a hollow portion for receiving the mating element and the flat plate. The flat plate is for moving the mating element received in the hollow portion in the releasing direction. The lever means and the manually operated means are for imparting to the flat plate a releasing force required to release the mating element. The lever means comprises an end portion mechanically coupled with a projection formed on the flat plate, an intermediate portion pivotally and rotatably supported on a support formed on the frame body, and an opposite end portion mechanically coupled with the manually operated means.

In order to release the mating element from engagement with the fixed contacts, the manually operated means is pressed in the engaging direction. In this event, the opposite end portion of the lever means rotates around the support in a counterclockwise direction. The mating element on the flat plate is caught by a hook formed on the flat plate and is moved in the releasing direction. As a result of the above-mentioned operation, the mating element is released from engagement with the fixed contacts.

As described above, the electrical connector equipped with a release mechanism is for engaging one electrical connector with one mating element. In order to release one mating element from engagement with one electrical connector, one release mechanism is needed.

On performing connection and disconnection of two mating elements, two electrical connectors are superposed and mounted on a chassis of an apparatus or a printed circuit board. Alternatively, two electrical connectors are mounted on a plane of the chassis of the apparatus or the printed circuit board in a parallel arrangement.

When two electrical connectors are superposed, a space occupied by the electrical connectors has an increased thickness. As a result, the apparatus suffers space restriction in thickness due to the electrical connectors.

When two electrical connectors are mounted on the same plane in a parallel arrangement, the apparatus has space restriction in the plane.

The mounting space further increases if more than two mating elements are connected in one-to-one correspondence to a plurality of electrical connectors.

In order to release two mating elements, two manually operated means must be sequentially pressed to move two flat plates one by one. Thus, the operation is complicated.

Otherwise, two manually operated means can be simultaneously pressed. In this event, a pushing force becomes twice strong. Subjected to the twice strong pushing force, the electrical connectors fixed to the chassis or the printed circuit board are caused to be removed therefrom or to be broken.

SUMMARY OF THE INVENTION:

It is therefore an object of this invention to provide an electrical connector equipped with a release mechanism which is capable of releasing a plurality of mating elements by operation of a single manually operated means.

It is another object of this invention to provide an electrical connector equipped with a release mechanism which can reduce a mounting space of the electrical connector.

It is a further object of this invention to provide an electrical connector equipped with a release mechanism for releasing a plurality of mating connectors in a time sequential fashion by simply operating a single manually operated means without increase of a pushing force.

An electrical connector equipped with a release mechanism according to this invention is for use in engagement of a plurality of mating elements and comprises an insulator frame body having hollow portions and a plurality of conductive fixed contacts arranged in the hollow portions, the hollow portions having an open end to allow reception of a plurality of the mating elements, each of the mating elements having a plurality of mating contacts to be brought into electrical contact with the fixed contacts in one-to-one correspondence while the mating element is coupled with the frame body, a release mechanism being formed in the frame body to move the mating elements in a releasing direction along which the mating contacts are released from engagement with the fixed contacts, the release mechanism comprising a plurality of flat plates inserted into the hollow portions in parallel to one another and in one-to-one correspondence to a plurality of the mating elements and movable in the releasing direction, a plurality of lever means for respectively moving a plurality of the flat plates in the releasing direction, and one manually operated means for rotating a plurality of the lever means, each of the flat plates having hook means for catching an engaging end face of a corresponding one of the mating elements to mechanically move the corresponding one of the mating elements in the releasing direction, each of the lever means being located in the midst of a travelling path of the manually operated means and having an end portion coupled to a corresponding one of the flat plates, an intermediate portion pivotally and rotatably supported on a support formed inside the frame body in the vicinity of the open end, and an opposite end portion coupled to a top end of the manually operated means.

According to an aspect of this invention, the arrangement of the manually operated means and a plurality of the lever means is such that a plurality of the lever means are caught at different coupling positions in the travelling path when the manually operated means is operated. The mating contacts are released from engagement with the fixed contacts in a time sequential fashion.

According to another aspect of this invention, the frame body comprises a chamber for receiving the opposite end portions of the lever means and the top end of the manually operated means. The chamber has a guide groove for guiding the top end of the manually operated means in the engaging and the releasing directions.

According to a further aspect of this invention, each of the flat plates comprises a first surface and a second surface opposite to the first surface. The first surface is provided at its center portion with a plate projection which projects on the first surface to be coupled with the end portion of a corresponding one of the lever means. The end portion of the lever means has a slit to be loosely fitted with the plate projection. The hook extends in a direction opposite to the plate projection. A plurality of the lever means are arranged opposite to the first surfaces of a plurality of the flat plates in one-to-one correspondence.

According to a still further aspect of this invention, each of the lever means is formed so that the distance between the end portion and the intermediate portion pivotally supported on the support is shorter than the distance between the intermediate portion and the opposite end portion.

According to a yet further aspect of this invention, the manually operated means is an ejector comprising a block body and an eject bar extending from a side surface of the block body along a longitudinal direction. The eject bar is provided with a plurality of lever coupling grooves extending from a top end of the eject bar towards the side surface of the block body. The opposite end portions of the lever means are coupled with the lever coupling grooves in one-to-one correspondence.

According to a further aspect of this invention, the lever coupling grooves extend from the top end of the eject bar towards the side surface of the block body and have different depths different from one another.

According to a further aspect of this invention, the lever coupling grooves extend from the top end of the eject bar towards the side surface of the block body and have the same depth. The opposite end portions of the lever means are coupled in one-to-one correspondence with the lever coupling grooves at different coupling positions.

According to a further aspect of this invention, the frame body has a guide frame attached to the frame body. The guide frame faces the open end of the frame body to receive the mating elements. The guide frame has a plurality of guide plates for guiding the mating elements into the hollow portion.

According to a further aspect of this invention, the guide frame has a bar receptacle formed at one side of the guide frame, and an engagement projection assembled in the bar receptacle and outwardly extending from an end face of the bar receptacle to face an opening of the chamber of the frame body. The bar receptacle is provided with a receptacle hole for receiving the manually operated means slidably in the engaging and the releasing directions. The engagement projection is provided with a bar insertion slit for allowing the manually operated means to pass therethrough along the engaging and the releasing directions.

According to a further aspect of this invention, the manually operated means comprises a block body having one surface provided with a narrow groove extending along the engaging direction. A guide projection is formed in the receptacle hole of the bar receptacle at a side opposite to the narrow groove. The guide projection is received in the narrow groove to restrict the movement of the manually operated means in the engaging and the releasing directions.

According to a further aspect of this invention, the guide frame comprises an elastic support member extending from the opposite side of the guide frame in parallel to the engagement projection. The elastic support member is coupled to the frame body through engagement with an outer wall of one side surface of the frame body.

DESCRIPTION OF THE PREFERRED EMBODIMENTS

FIGS. 1 through 5 show an electrical connector equipped with a release mechanism according to an embodiment of this invention.

Referring to FIGS. 1 through 5, the electrical connector equipped with a release mechanism comprises an insulator frame body 10 and a release mechanism for releasing a plurality of mating elements 20 such as IC memory cards. In the embodiment illustrated in FIGS. 1 through 5, the electrical connector is capable of performing connection and disconnection between two mating elements 20a and 20b and one frame body 10.

Figure 1:
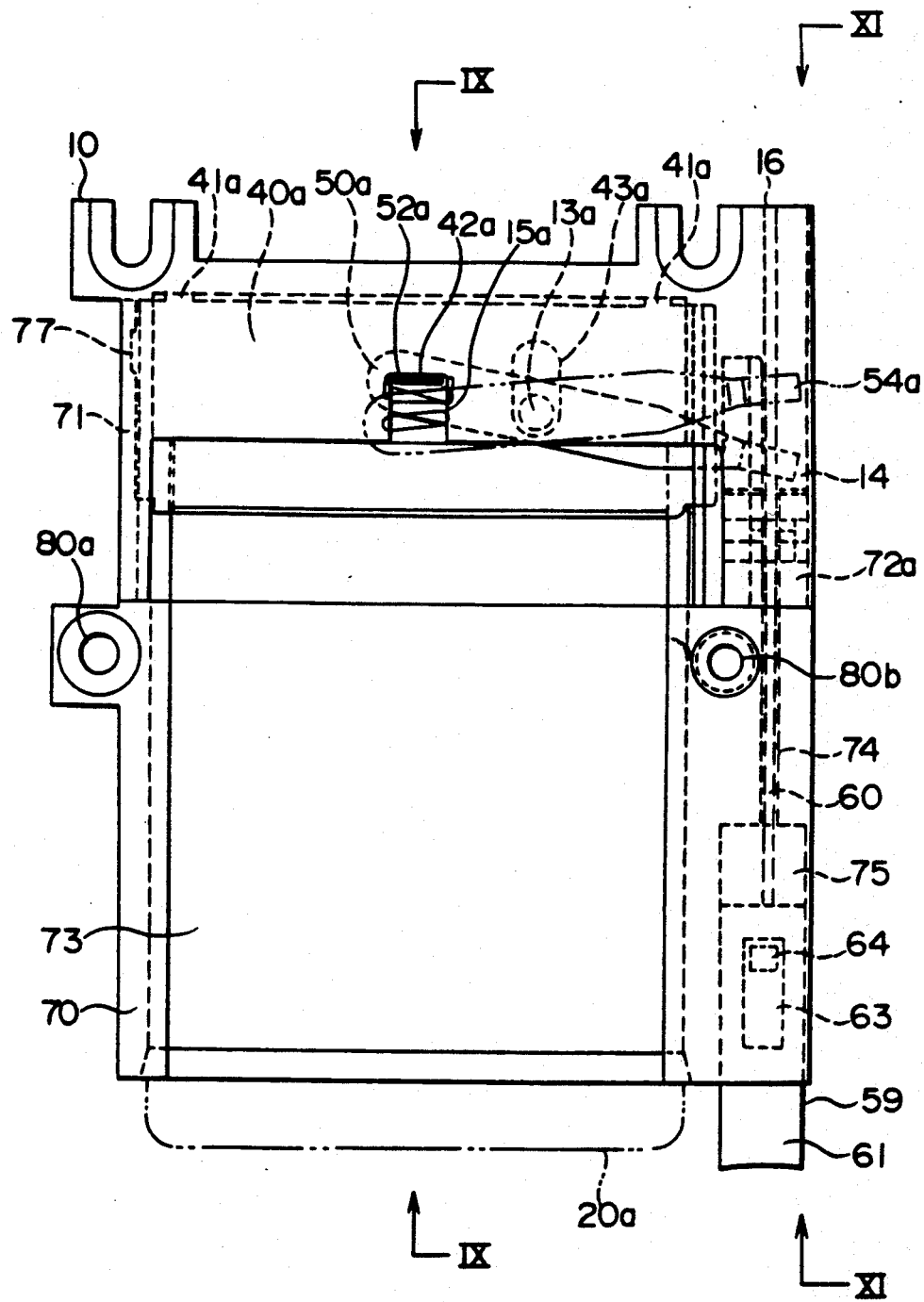
FIG. 1 is a plan view of an electrical connector equipped with a release mechanism according to one embodiment of this invention.

In FIG. 1, a first mating element 20a in an engagement state is shown by a double dot-and-dash line. A second mating element 20b is also engaged with the frame body 10 under the first mating element 20a, although not shown in FIG. 1.

Figure 2:
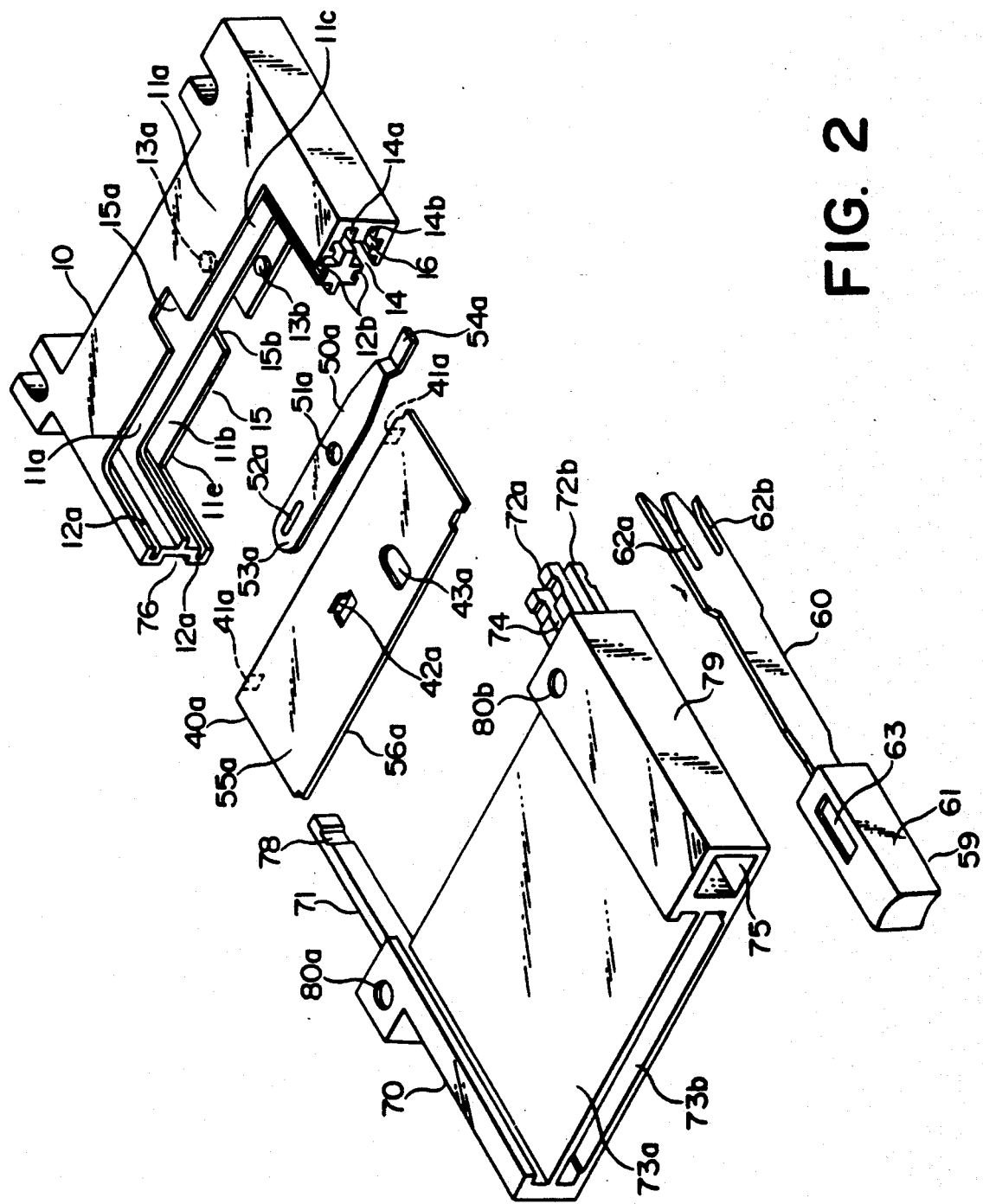
FIG. 2 is an exploded perspective view of the electrical connector equipped with a release mechanism illustrated in FIG. 1 with one pair of a flat plate and an eject lever being omitted.
Figure 3:
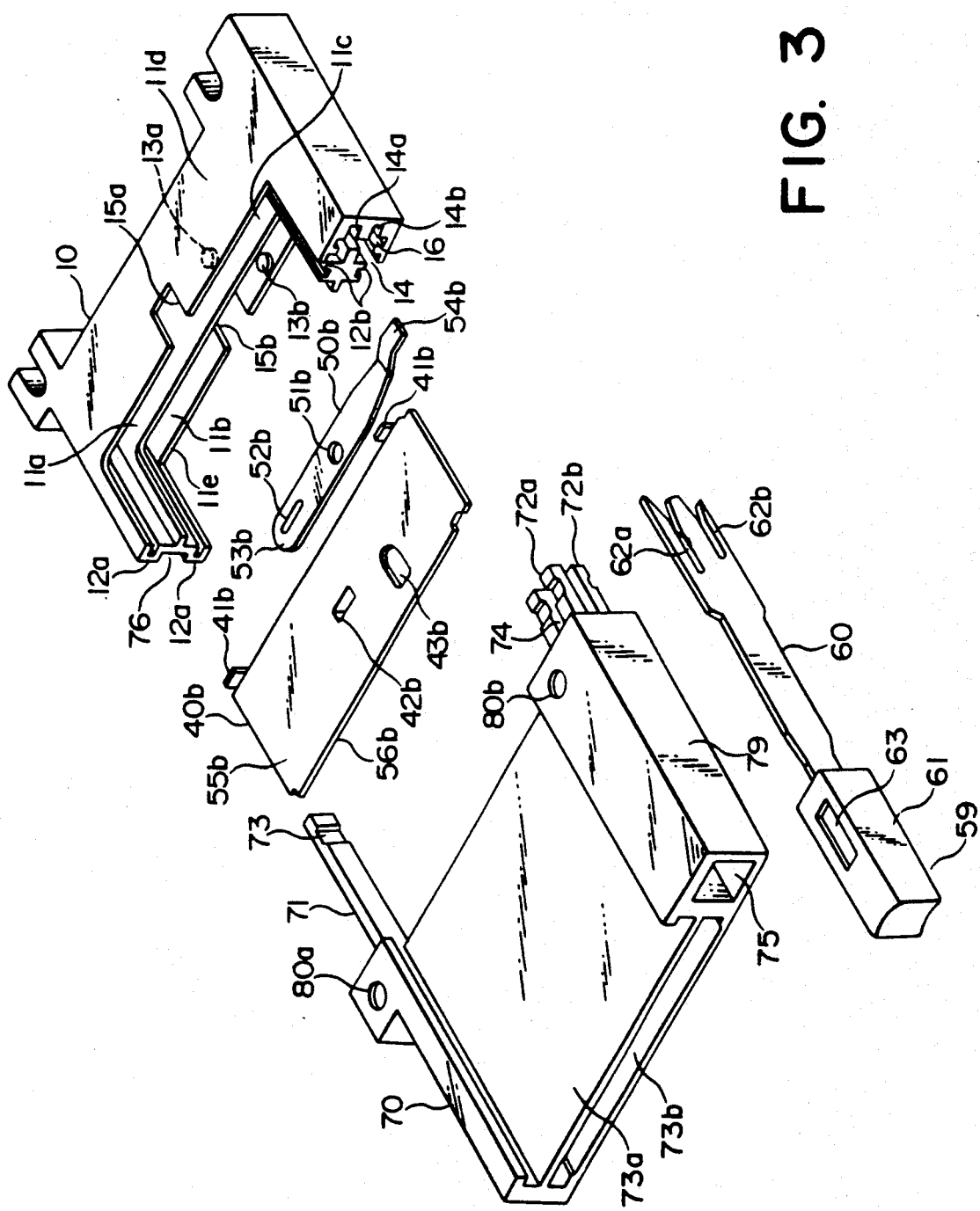
FIG. 3 is an exploded perspective view of the electrical connector equipped with a release mechanism illustrated in FIG. 1 with another pair of a flat plate and an eject lever being omitted.

FIG. 2 shows, together with the frame body 10, a single ejector 59, a guide frame 70, a first flat plate 40a, and a first eject lever 50a which will later be described. FIG. 3 shows, together with the frame body 10, the ejector 59, the guide frame 70, a second flat plate 40b, and a second eject lever 50b which will later be described.

Figure 4:
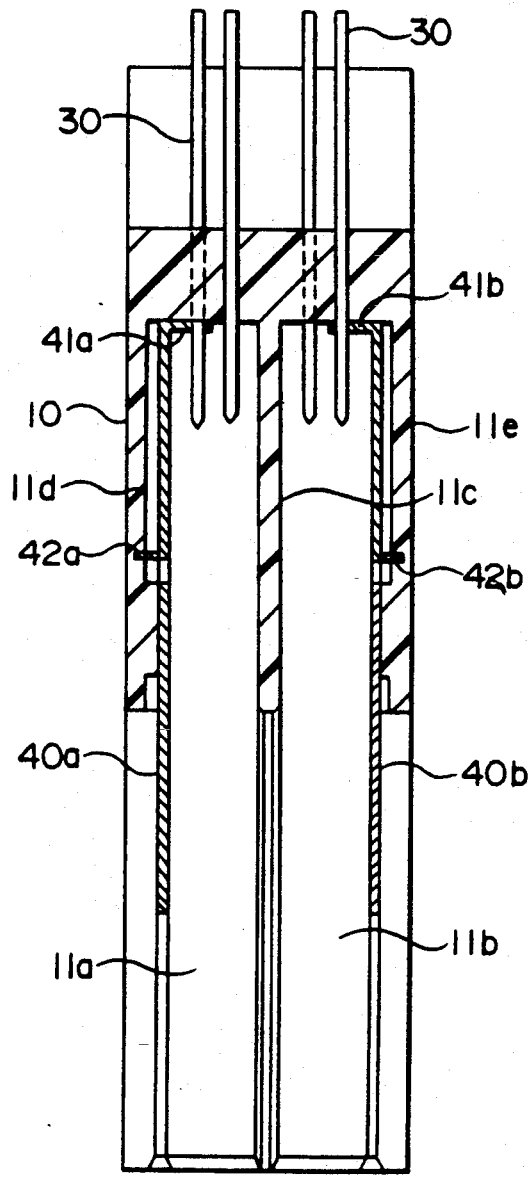
FIG. 4 is a sectional view taken along a line IX—IX in FIG. 1.
Figure 5:
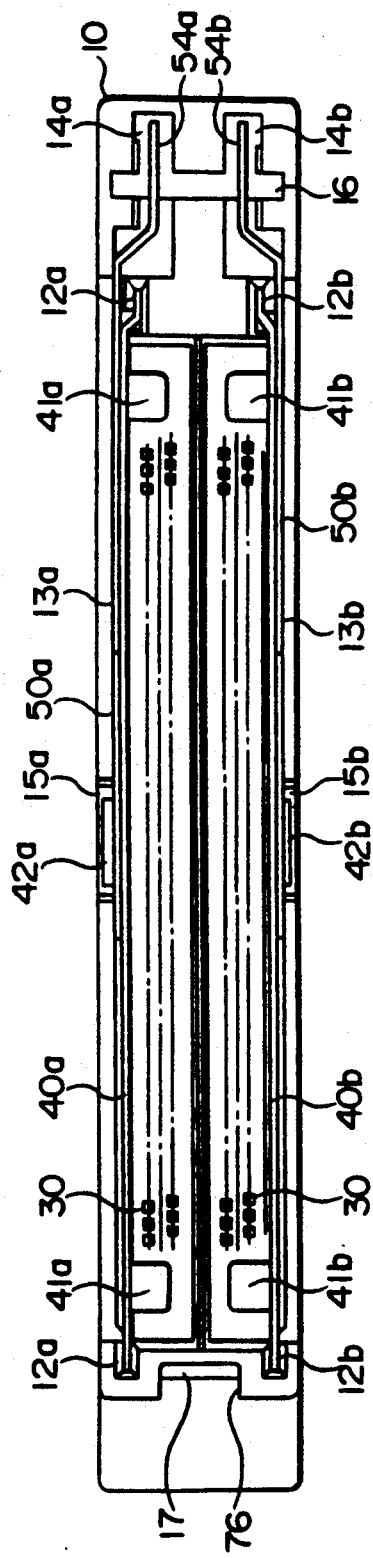
FIG. 5 is a front view of the release mechanism and a frame body shown in FIG. 1.

The frame body 10 has an intermediate plate 11c, an upper plate 11d, and a lower plate 11e. The upper and the lower plates 11d and 11e are arranged in parallel to the intermediate plate 11c and are upwardly and downwardly spaced from the intermediate plate 11c, respectively. Thus, the frame body 10 has a first hollow portion 11a and a second hollow portion 11b defined by the intermediate plate 11c and the upper plate 11d and by the intermediate plate 11c and the lower plate 11e, respectively. The first and the second hollow portions 11a and 11b has an open end 15 to allow insertion of the first and the second mating elements 20a and 20b into the first and the second hollow portions 11a and 11b, respectively. The first and the second mating elements 20a and 20b are kept in parallel to each other and inserted into the first and the second hollow portions 11a and 11b, respectively. The first and the second hollow portions 11a and 11b are provided with a plurality of conductive fixed contacts 30, as shown in FIGS. 4 and 5.

The first and the second mating elements 20a and 20b have a plurality of mating contacts (not shown) which are brought into electrical contact with the fixed contacts 30 when the first and the second mating elements 20a and 20b are coupled with the frame body 10.

The release mechanism is for releasing the mating contacts from engagement with the fixed contacts 30 by moving the mating contacts in a releasing direction. The release mechanism comprises the first and the second flat plates 40a and 40b mounted in the first and the second hollow portions 11a and 11b, respectively, first and second lever members for moving the first and the second flat plates 40a and 40b, respectively, and a manually operated member for rotating the first and the second lever members.

The first and the second lever members have a first eject lever 50a and a second eject lever 50b, respectively. The first and the second eject levers 50a and 50b have end portions 53a and 53b coupled to the first and the second flat plates 40a and 40b, respectively. The first and the second eject levers 50a and 50b have opposite end portions 54a and 54b coupled to the manually operated member. The manually operated member comprises the ejector 59 movable in engaging and releasing directions.

Assembled into the first and the second hollow portions 11a and 11b, the fixed pin contacts 30 extend in parallel to one another along the engaging and the releasing directions. The fixed pin contacts 30 is adapted to be brought into contact with the mating contacts (socket contacts). The frame body 10 has opposite side walls whose inner surfaces are provided with a first pair of grooves 12a and a second pair of grooves 12b, respectively. In the first and the second pairs of grooves 12a and 12b, opposite ends of the first and the second flat plates 40a and 40b are fitted to be slidable in the engaging and the releasing directions.

As best shown in FIG. 2, the first flat plate 40a is located in the vicinity of the upper plate 11d and between the upper plate 11d and the intermediate plate 11c so as to be movable in the engaging and the releasing directions. The first flat plate 40a is provided at its engaging end with a pair of first hooks 41a which are coupled with an engaging end face of the first mating element 20a to release the first mating element 20a.

The first flat plate 40a further comprises a first surface 55a and a second surface 56a opposite to the first surface 55a. The first surface 55a is provided at its center portion with a first plate projection 42a projecting on the first surface 55a. The first plate projection 42a is coupled with the end portion 53a of the first eject lever 50a. The first hooks 41a extend in a direction opposite to the first plate projection 42a. The first surface 55a is opposite to the first eject lever 50a.

The first eject lever 50a is provided at its center portion with an axial hole 51a. The axial hole 51a is coupled to a first support 13a of a cylindrical shape formed on the upper plate 11d. The first support 13a is positioned in the vicinity of the open end 15 of the first hollow portion 11a. The first eject lever 50a is coupled to the first support 13a to be rotatable around the first support 13a. The first eject lever 50a is provided at the end portion 53a with a longitudinal slit 52a. The plate projection 42a is loosely fitted in the slit 52a. The first eject lever 50a has an opposite end portion 54a extending into a chamber 14 formed in one of the side walls of the frame body 10.

In this structure, when the opposite end portion 54a of the first eject lever 50a is rotated in clockwise and counterclockwise directions, the first flat plate 40b is moved in the engaging and the releasing directions.

The first flat plate 40a is provided with a longitudinal aperture 43a extending along the engaging and the releasing directions. The first support 13a has a height substantially equal to the thickness of the first flat plate 40a. The first support 13a is freely fitted in the longitudinal aperture 43a.

On the other hand, the second flat plate 40b is best shown in FIG. 3. The second flat plate 40b is located in the vicinity of the lower plate 11e and in the second hollow portion 11b between the lower plate 11e and the intermediate plate 11c so as to be movable in the engaging and the releasing directions. The second flat plate 40b is provided at its engaging end with a pair of second hooks 41b. The second hooks 41b are coupled to an engaging end face of the second mating element 20b, which is hidden under the first mating element 20a in FIG. 1, to release the second mating element 20b.

The second flat plate 40b further comprises a first surface 55b and a second surface 56b opposite to the first surface 55b. The second surface 56b is provided at its center portion with a second plate projection 42b projecting on the second surface 56b. The second plate projection 42b is coupled with the end portion 53b of the second eject lever 50b. The second eject lever 50b is provided at the end portion 53b with a longitudinal slit 52b loosely fitted to the second plate projection 42b. The second hooks 41b extend in a direction opposite to the second plate projection 42b. The second eject lever 50a is opposite to the second surface 56b of the second flat plate 40b.

The second eject lever 50b is provided at its center portion with an axial hole 51b. The axial hole 51b is coupled to a second support 13b formed on the lower plate 11e. The second eject lever 50b is coupled to the second support 13b to be rotatable around the second support 13b. The second eject lever 50b has an opposite end portion 54b extending into the chamber 14 formed in one of the side walls of the frame body 10.

In this structure, when the opposite end portion 54b of the second eject lever 50b is rotated in the clockwise and the counterclockwise directions, the second flat plate 40b is moved in the engaging and the releasing directions.

The second flat plate 40b is provided with a longitudinal aperture 43b extending along the engaging and the releasing directions. The second hollow portion 11b is provided with the second support 13b formed on the lower plate 11e in the vicinity of the open end 15. The second eject lever 50b is rotatably coupled to the second support 13b. The second support 13b has a height substantially equal to the thickness of the second flat plate 40b. The second support 13b is freely fitted in the longitudinal aperture 43b.

The upper and the lower plates 11d and 11e of the frame body 10 are provided at their intermediate portions with escape grooves 15a and 15b inwardly extending from the open end 15, respectively. The escape grooves 15a and 15b serve to avoid interference with the plate projections 42a and 42b, respectively.

When the first and the second mating elements 20a and 20b are inserted, the end faces of the first and the second mating elements 20a and 20b press the first and the second hooks 41a and 41b in the engaging direction, respectively. Further pressing operation forces the first and the second flat plates 40a and 4-b to move in the engaging direction. Simultaneously, the first and the second mating elements 20a and 20b are inserted in the first and the second hollow portions 11a and 11b, respectively. As a result, the mating contacts are brought into contact with the fixed contacts 30.

As shown in FIGS. 2 and 3, a combination of the second flat plate 40b and the second eject lever 50b and a combination of the first flat plate 40a and the first eject lever 50a are attached to the frame body 10 to be symmetrical with each other.

An insulator guide frame 70 is coupled to the 70 comprises upper and lower guide plates 73a and 73b flush with the intermediate plate 11c and the lower plate 11e of the frame body 10, respectively. The upper and the lower guide plates 73a and 73b are spaced from each other. A first space is defined on the upper plate 73a to receive the first mating element 20a while a second space is defined between the upper and the lower plates 73a and 73b to receive the second mating element 20b. The upper and the lower guide plates 73a and 73b serve to guide the movement of the first and the second mating elements 20a and 20b in the engaging and the releasing directions. The first space on the upper guide plate 73a is opened except opposite sides of the guide frame 70. At one side of the guide frame 70, an elastic support member 71 extends along the engaging direction. The elastic support member 71 is attached to the frame body 10 through a coupling groove 76 formed on an outer surface of one side wall of the frame body 10. The elastic support member 71 is provided with a recess 78 to be fitted to the coupling projection 77 (in FIGS. 1 and 5) formed in the coupling groove 76. The guide frame 70 is provided with upper and lower engagement projections 72a and 72b extending in a direction parallel to the elastic support member 71. The upper and the lower engagement projections 72a and 72b are inserted within upper and lower reception grooves 14a and 14b formed in the chamber 14.

Figure 6:
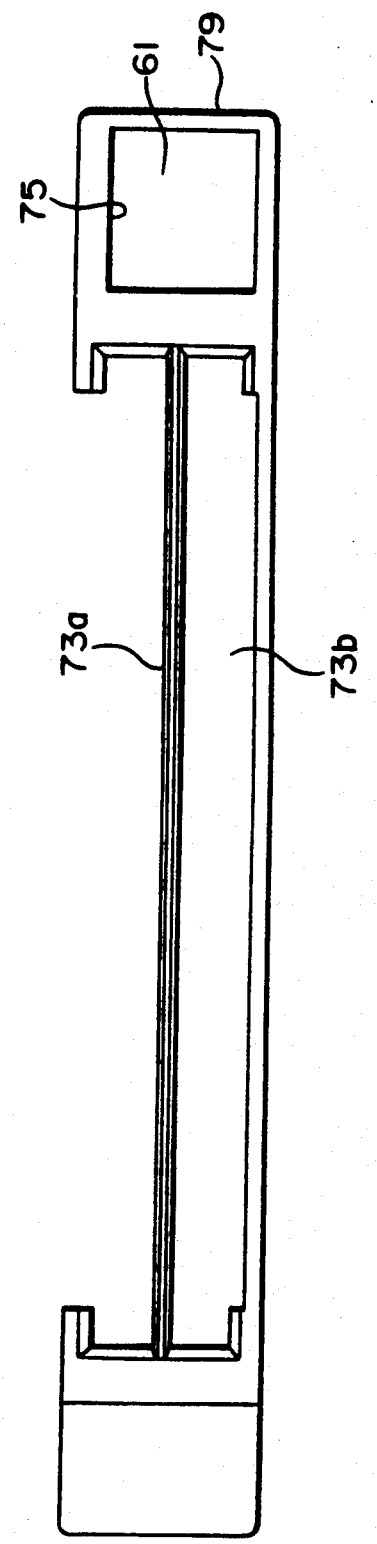
FIG. 6 is a front view of a guide frame shown in FIG. 1.
Figure 7:
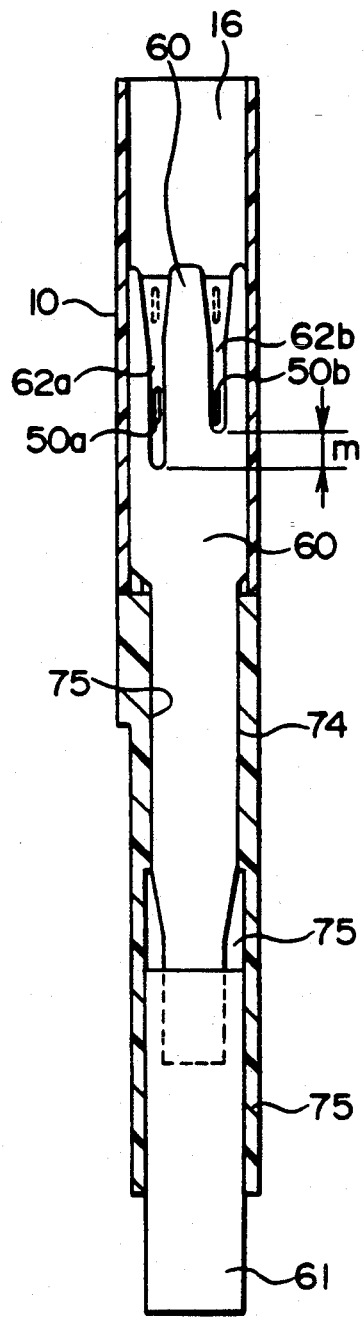
FIG. 7 is a sectional view taken along a line Xi—XI in FIG. 1.

As also shown in FIGS. 5 and 6, the ejector 59 has a block body 61 and an eject bar 60 of a plate-like shape extending from one end of the block body in a direction away from the block body 61. The chamber 14 of the frame body 10 is provided with a guide groove 16 extending across the upper and the lower reception grooves 14a and 14b. A top end of the eject bar 60 is inserted in the guide groove 16. A bar insertion slit 74 is formed in the engagement projections 72a and 72b along the engaging direction. The eject bar 60 is slidably inserted in the bar insertion slit 74. The guide frame 70 is provided with a bar receptacle 79 at the other side. The bar receptacle 79 is provided with a receptacle hole 75 for receiving the block body 61.

The eject bar 60 is provided at its one surface with a groove 63. The groove 63 is engaged with a guide projection 64 (FIG. 1) formed in the receptacle hole 75 to avoid removal of the eject bar 60. The groove 63 is slightly longer in shape in the engaging and the releasing directions. The eject bar 60 is movable in the bar insertion slit 74 and the guide groove 16. The receptacle hole 75 is provided at a portion opposite to the groove 63 with the guide projection 64 fitted in the groove 63 to restrict the movement of the ejector 59 in the engaging and the releasing directions.

The first and the second eject levers 50a and 50b are positioned in the midst of a travelling path of the ejector 59 so that the opposite end portions 54a and 54b engaged with the top end of the eject bar 60. The eject bar 60 has first and second lever coupling grooves 62a and 62b at its top end. The eject bar 60 is inserted in the receptacle hole 75, the bar insertion slit 74, and the guide groove 16 with the lever coupling grooves 62a and 62b being oriented ahead in the engaging direction. When the eject bar 60 is inserted into the receptacle hole 75, the lever engaging grooves 62a and 62b are engaged with the opposite end portions 54a and 54b of the first and the second eject levers 50a and 50b, respectively.

Next, releasing operation of the first and the second mating elements 20a and 20b will be described with reference to FIGS. 1 and 7 through 10. When the first and the second eject levers 50a and 50b are placed at a position depicted by a combination of a solid line and a dotted line in FIG. 1, the first and the second mating elements 20a and 20b are engaged with the fixed contacts 30.

Figure 10:
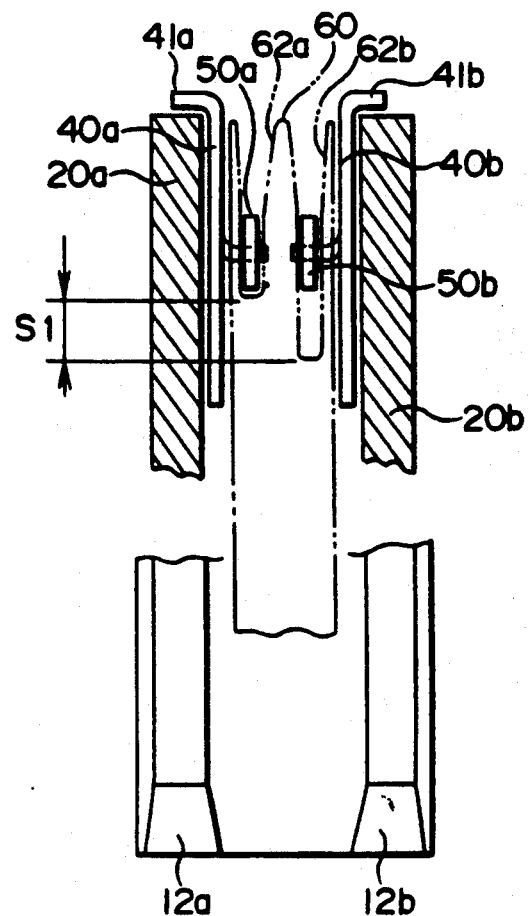
FIG. 10 is a sectional view for describing a coupling state of one manually operated means and a plurality of lever means in FIG. 1.

At first, the first and the second mating elements 20a and 20b are inserted into the first and the second hollow portions 11a and 11b, respectively. In this event, the top ends of the first and the second mating elements 20a and 20b are brought into contact with the first and the second hooks 41a and 41b of the first and the second flat plates 40a and 40b, respectively. The flat plates 40a and 40b are pushed in the engaging direction depicted by an arrow in FIG. 8 with a moving distance W. The push stroke of the ejector 59 is equal to SW. Then, the first and the second eject levers 50a and 50b rotate in the clockwise direction with the movement of the first and the second flat plates 40a and 40b in the engaging direction, respectively. The eject bar 61 is forced to project from a forward end of the guide frame 70, as shown in FIG. 10. Thus, the first and the second mating elements 20a and 20b are coupled with the frame body 10. Such state transition is shown in FIG. 1 where the first eject lever 50a is moved from the position depicted by the double dot-and-dash line to the position depicted by a combination of the solid line and the dotted line.

The slits 52a and 52b of the first and the second eject levers 50a and 50b are positioned at center portions of the first and the second flat plates 40a and 40b, respectively, as well as the first and the second plate projections 42a and 42b. Accordingly, the force to remove the first and the second flat plates 40a and 40b is always applied to the center portions.

When the ejector 59 is further pushed in the engaging direction, the first and the second mating elements 20a and 20b are released in the releasing direction by the first and the second hooks 41a and 41b of the first and the second flat plates 40a and 40b. In other words, the first and the second mating elements 20a and 20b are released from engagement with the fixed contacts 30 in one step of pushing operation of the ejector 59. As is also shown in FIG. 10, the lever coupling grooves 62a and 62b of the ejector 59 have the difference m (FIG. 7) in depth in the engaging and the releasing directions. Accordingly, the first and the second eject levers 50a and 50b are moved with a time delay S1. Likewise, the first and the second flat plates 40a and 40b are moved with the time delay S1. Thus, the first and the second mating elements 20a and 20b are sequentially released from engagement with the fixed contacts 30 with the time delay. Accordingly, the reduced.

Preferably, the difference between the depths of the first and the second lever coupling grooves 62a and 62b is determined so that one of the mating elements 20a and 20b is released from the fixed contacts 30 after the other of the mating elements 20a and 20b is released from the fixed contacts 30.

Figure 8:
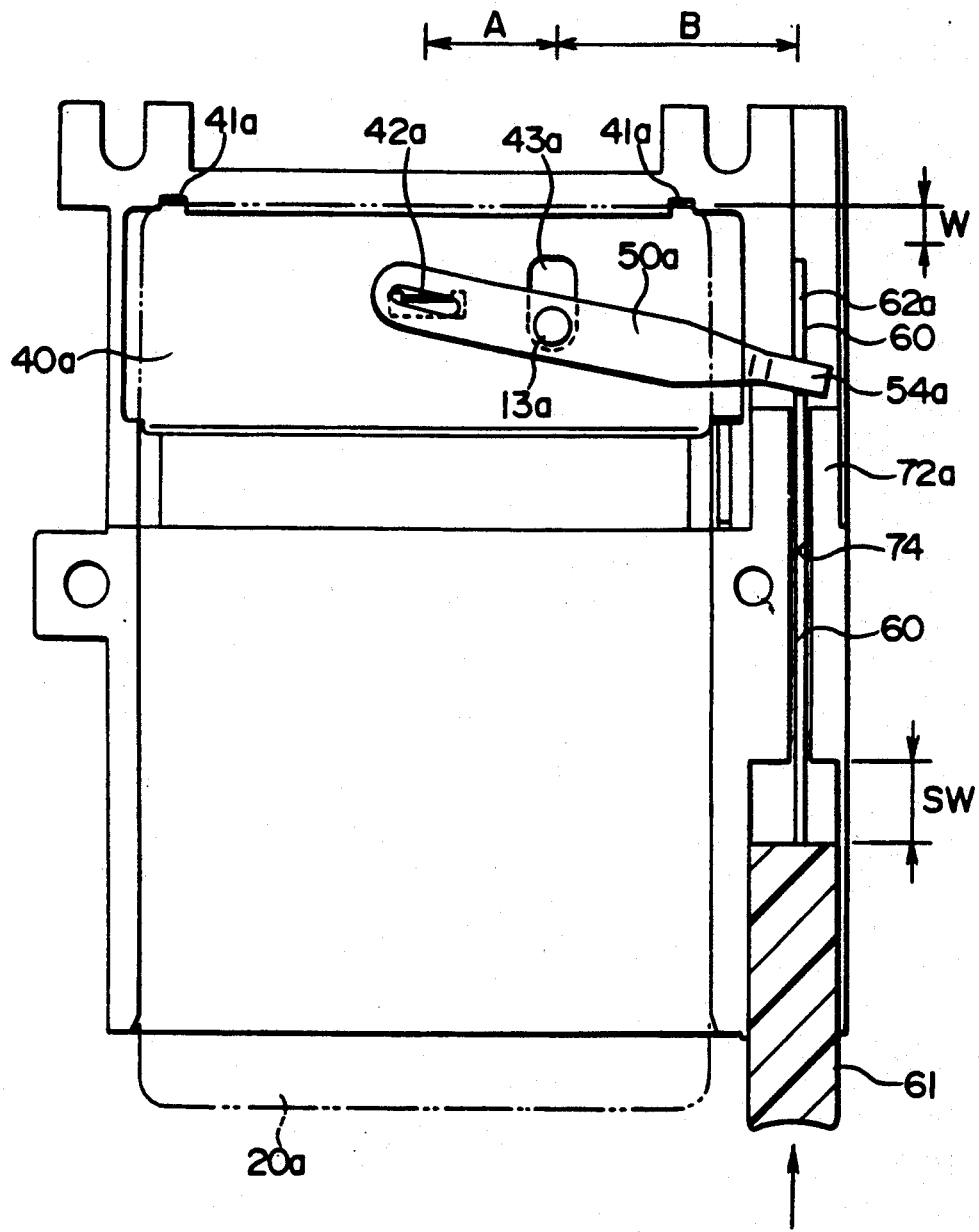
FIG. 8 is a partially sectional plan view of the electrical connector equipped with a release mechanism illustrated in FIG. 1 with mating elements being engaged.
Figure 9:
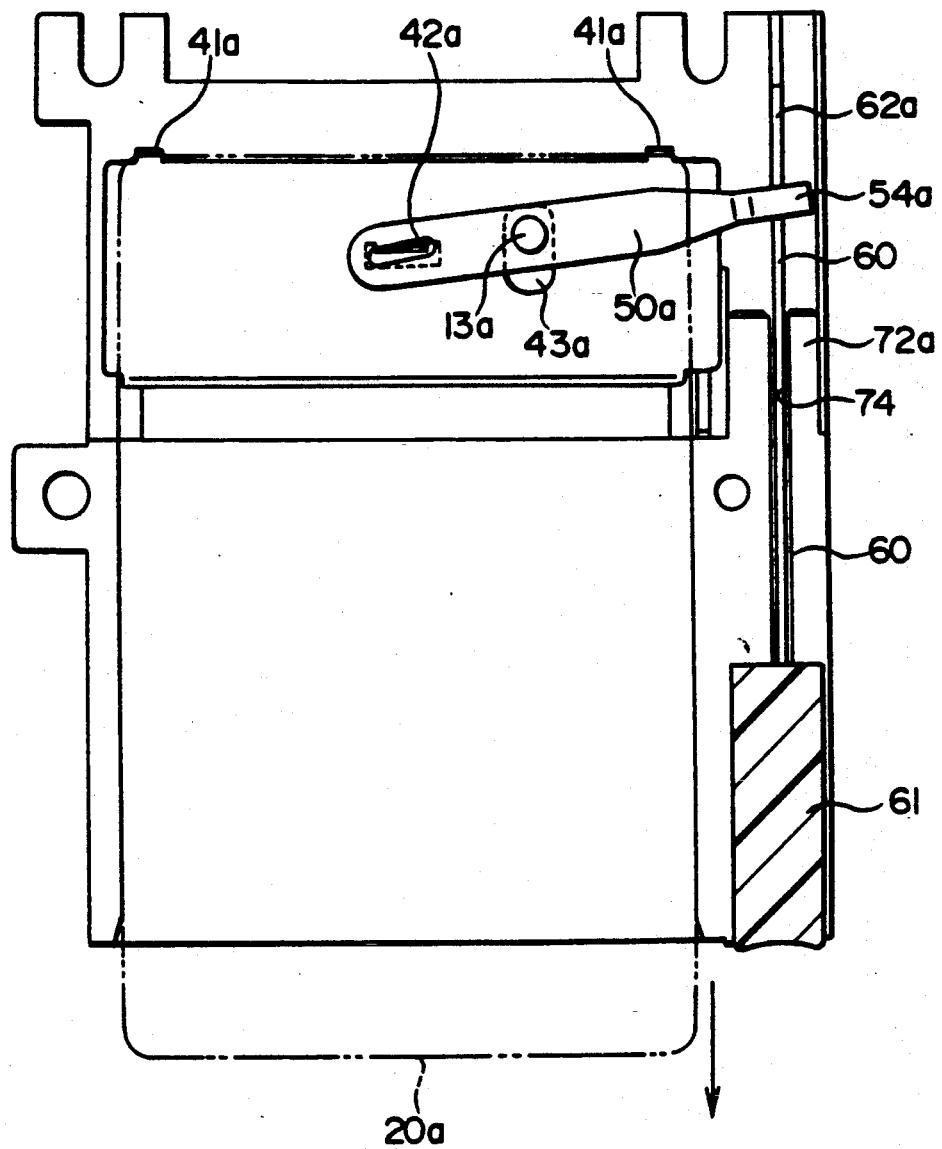
FIG. 9 is a partially sectional plan view of the electrical connector equipped with a release mechanism illustrated in FIG. 1 with mating elements being released.

In the first eject lever 50a, the distance between the axial hole 51a and the slit 52a and the distance between the axial hole 51a and the lever coupling groove 62a of the ejector 59 is represented by A and B, respectively. Likewise in the second eject lever 50b, the distance between the axial hole 51b and the slit b and the distance between the axial hole 51b and the lever coupling groove 62b of the ejector 59 is represented by A and B, respectively. As shown in FIG. 8, the distances A and B are selected so that the distance A is smaller than the distance B. In this event, the pushing force of the ejector 59 is smaller than the releasing force of the mating elements 20a and 20b.

Figure 11:
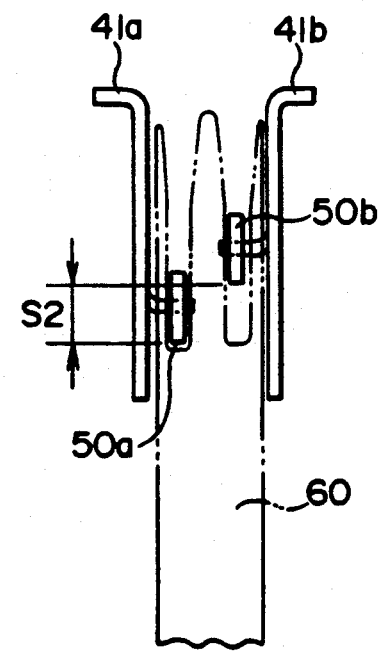
FIG. 11 is a sectional view for describing a coupling state of one manually operated means and a plurality of lever means according to another embodiment.

In the eject bar 60 illustrated in FIG. 11, the lever coupling grooves 62a and 62b have the same depth while the first and the second eject levers 50a and 50b are shifted from each other. In this structure also, the release timings are different, namely, the time delay S2 is produced.

Figure 12:
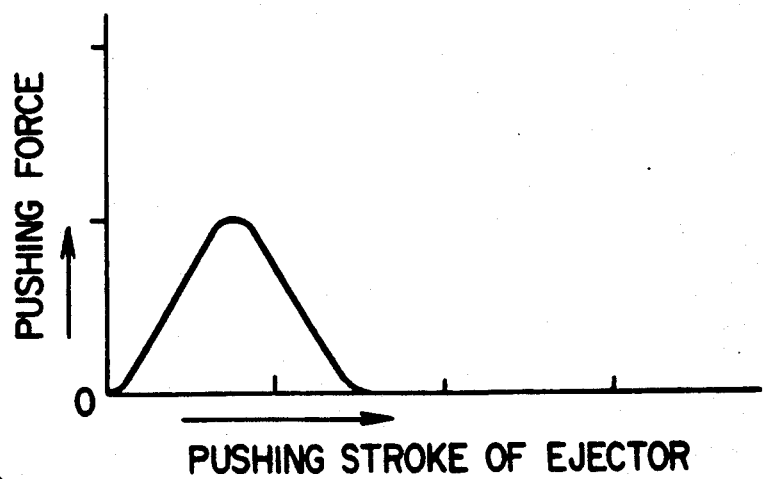
FIG. 12 is a graph showing a pushing force for releasing one mating element by one manually operated means.
Figure 13:
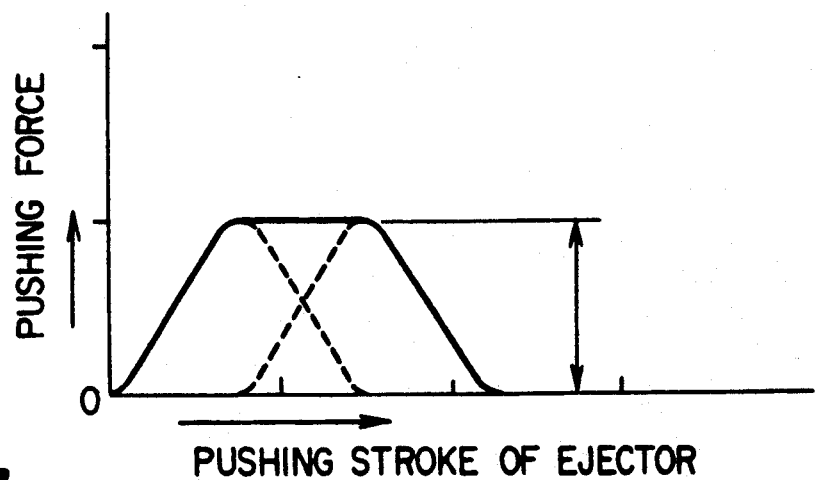
FIG. 13 is a graph showing a pushing force for releasing two mating elements by one manually operated means in a time sequential fashion.
Figure 14:
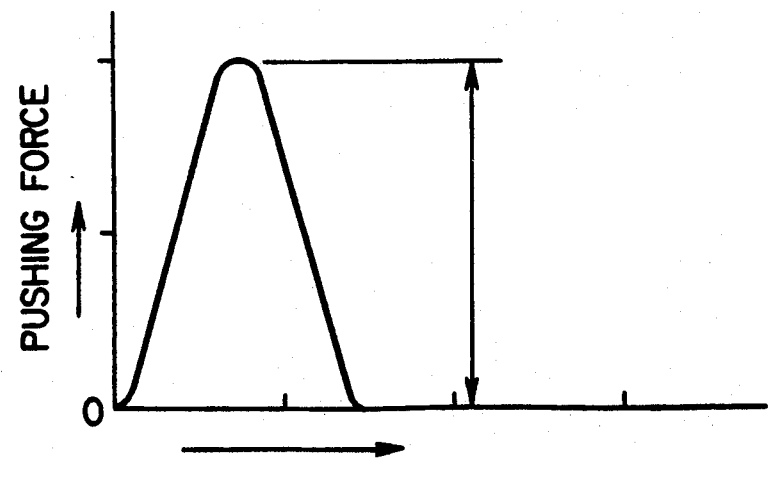
FIG. 14 is a graph showing a pushing force for simultaneously releasing two mating elements by one manually operated means.

FIG. 12 shows a relationship between the pushing force and the pushing stroke of the ejector 59 in case when the first eject lever 50a is operated by one ejector 59. FIG. 13 shows a relationship between the pushing force and the pushing stroke of the ejector 59 in case when the first and the second eject levers 50a and 50b are operated by one ejector 59. In this case, operation can be performed with the pushing force equal to the pushing force in FIG. 12. As shown in FIG. 14, the pushing force has a twice value in case when the first and the second eject levers 50a and 50b are simultaneously pushed by one ejector 59.

The guide frame 70 is provided with fastening holes 80a and 80b for fastening the guide frame 70 to the chassis of the apparatus or the printed circuit board. The electrical connector equipped with a release mechanism is mounted on the circuit board (not shown). The contacts 30 are connected to conductors on the circuit board through terminal portions outwardly extending from the frame body 10. In this structure, two mating elements 20a and 20b are received in one electrical connector with one release mechanism without overlapping two electrical connectors each of which is equipped with a release mechanism. Accordingly, the space occupied by the release mechanism is reduced in thickness to save the space for mounting the mating elements 20a and 20b. As described, the electrical connector equipped with a release mechanism is capable of connecting one electrical connector and a plurality of mating elements in a time sequential fashion.

In the electrical connector according to this invention, the frame body 10 has a thin portion interposed between the mating elements 20a and 20b. Thus, the space is saved for mounting the mating elements 20a and 20b without overlapping two electrical connectors having thicker frames.

What is claimed is:

1. An electrical connector equipped with a release mechanism for use in engagement of a plurality of mating elements, comprising:

an insulator frame body having hollow portions and a plurality of conductive fixed contacts arranged in said hollow portions, said hollow portions having an open end to allow reception of a plurality of said mating elements, each of said mating elements having a plurality of mating contacts to be brought into electrical contact with said fixed contacts in one-to-one correspondence while said mating element is coupled with said frame body, a release mechanism being formed in said frame body to move said mating elements in a releasing direction along which said mating contacts are released from engagement with said fixed contacts, said release mechanism comprising a plurality of flat plates inserted into said hollow portions in parallel to one another and in one-to-one correspondence to a plurality of said mating elements and movable in said releasing direction, a plurality of lever means for respectively moving a plurality of said flat plates in said releasing direction, and one manually operated means for rotating a plurality of said lever means, each of said flat plates having hook means for catching an engaging end face of a corresponding one of said mating elements to mechanically move the corresponding one of said mating elements in said releasing direction, each of said lever means being located in the midst of a travelling path of said manually operated means and having an end portion coupled to a corresponding one of said flat plates, an intermediate portion pivotally and rotatably supported on a support formed inside said frame body in the vicinity of said open end, and an opposite end portion coupled to a top end of said manually operated means.

2. An electrical connector equipped with a release mechanism as claimed in claim 1, wherein the arrangement of said manually operated means and a plurality of said lever means is such that a plurality of said lever means are caught at different coupling positions in said travelling path when said manually operated means is operated, said mating contacts being released from engagement with said fixed contacts in a time sequential fashion.

3. An electrical connector equipped with a release mechanism as claimed in claim 1, each of said flat plates comprising a first surface and a second surface opposite to said first surface, said first surface being provided at its center portion with a plate projection which projects on said first surface to be coupled with said end portion of a corresponding one of said lever means, said end portion of said lever means has a slit to be loosely fitted with said plate projection, said hook extending in a direction opposite to said plate projection, a plurality of said lever means being arranged opposite to said first surfaces of a plurality of said flat plates in one-to-one correspondence.

4. An electrical connector equipped with a release mechanism as claimed in claim 1, each of said lever means being formed so that the distance between said end portion and said intermediate portion pivotally supported on said support is shorter than the distance between said intermediate portion and said opposite end portion.

5. An electrical connector equipped with a release mechanism as claimed in claim 1, said frame body comprising a chamber for receiving said opposite end portions of said lever means and said top end of said manually operated means, said chamber having a guide groove for guiding said top end of said manually operated means in said engaging and said releasing directions.

6. An electrical connector equipped with a release mechanism as claimed in claim 5, said frame body having a guide frame attached to said frame body, said guide frame facing said open end of said frame body to receive said mating elements, said guide frame having a plurality of guide plates for guiding said mating elements into said hollow portion.

7. An electrical connector equipped with a release mechanism as claimed in claim 6, said manually operated means comprising a block body having one surface provided with a narrow groove extending along said engaging direction, a guide projection being formed in said receptacle hole of said bar receptacle at a side opposite to said narrow groove, said guide projection being received in said narrow groove to restrict the movement of said manually operated means in said engaging and said releasing directions.

8. An electrical connector equipped with a release mechanism as claimed in claim 6, said guide frame having a bar receptacle formed at one side of said guide frame, and an engagement projection assembled in said bar receptacle and outwardly extending from an end face of said bar receptacle to face an opening of said chamber of said frame body, said bar receptacle being provided with a receptacle hole for receiving said manually operated means slidably in said engaging and said releasing directions, said engagement projection being provided with a bar insertion slit for allowing said manually operated means to pass therethrough along said engaging and said releasing directions.

9. An electrical connector equipped with a release mechanism as claimed in claim 8, said guide frame comprising an elastic support member extending from other side of said guide frame in parallel to said engagement projection, said elastic support member being coupled to said frame body through engagement with an outer wall of one side surface of said frame body.

10. An electrical connector equipped with a release mechanism as claimed in 1, said manually operated means being an ejector comprising a block body and an eject bar extending from a side surface of said block body along a longitudinal direction, said eject bar being provided with a plurality of lever coupling grooves extending from a top end of said eject bar towards said side surface of said block body, said opposite end portions of said lever means are coupled with said lever coupling grooves in one-to-one correspondence.

11. An electrical connector equipped with a release mechanism as claimed in claim 10, said lever coupling grooves extend from said top end of the eject bar towards said side surface of said block body and have different depths different from one another.

12. An electrical connector equipped with a release mechanism as claimed in claim 10, said lever coupling grooves extend from said top end of said eject bar towards said side surface of said block body and have the same depth, said opposite end portions of said lever means being coupled in one-to-one correspondence with said lever coupling grooves at different coupling positions.

* * * * *